United States Patent
Clodic et al.

(10) Patent No.: US 6,944,969 B2
(45) Date of Patent: Sep. 20, 2005

(54) METHOD AND INSTALLATION FOR DRYING A MASS OF FIBROUS MATERIALS BY MECHANICAL COMPRESSION OF VERY MOIST AIR

(75) Inventors: Denis Clodic, Paris (FR); Lionel Palandre, La Varenne Saint (FR)

(73) Assignee: Armines, Paris (FR)

( * ) Notice: Subject to any disclaimer, the term of this patent is extended or adjusted under 35 U.S.C. 154(b) by 0 days.

(21) Appl. No.: 10/499,572

(22) PCT Filed: Dec. 18, 2002

(86) PCT No.: PCT/FR02/04434
§ 371 (c)(1),
(2), (4) Date: Nov. 10, 2004

(87) PCT Pub. No.: WO03/054483
PCT Pub. Date: Mar. 7, 2003

(65) Prior Publication Data
US 2005/0072020 A1 Apr. 7, 2005

(30) Foreign Application Priority Data
Dec. 21, 2001 (FR) ............................. 01 16767

(51) Int. Cl.⁷ ................................. F26B 23/00
(52) U.S. Cl. ..................... 34/513; 34/140; 34/604
(58) Field of Search ................. 34/427, 499, 513, 34/140, 86, 604; 68/18

(56) References Cited

U.S. PATENT DOCUMENTS

| 4,065,253 A | * | 12/1977 | Bullock ...................... 432/105 |
| 4,268,247 A | * | 5/1981 | Freze ........................... 432/21 |
| 4,549,362 A | * | 10/1985 | Haried ........................ 34/395 |
| 5,553,391 A | * | 9/1996 | Bakalar ....................... 34/110 |
| 5,791,065 A | * | 8/1998 | Gamble et al. ............... 34/110 |
| 6,161,306 A | * | 12/2000 | Clodic ......................... 34/321 |

FOREIGN PATENT DOCUMENTS

| EP | 0 273 406 A2 | 7/1988 |
| FR | 2 745 896 | 9/1997 |
| FR | 2 785 372 | 5/2000 |
| GB | 2 135 034 A | 8/1984 |

* cited by examiner

Primary Examiner—Stephen Gravini
(74) Attorney, Agent, or Firm—RatnerPrestia

(57) ABSTRACT

The present invention pertains to a method and an installation or system for drying fibrous material. The method comprises the step of ventilating very moist air through the fibrous material located in a drying zone. The moisture content of the moist air is less than that inside the drying zone, its pressure is close to atmospheric pressure and its temperature is higher than that of the material to be dried. The method additionally comprises the step of recovering the heat of condensation of the water vapor extracted from the fibrous material to heat the moist air, providing leaks between the outside ambient air and the ventilation circuit upstream and downstream of the drying zone, making possible a mass and heat exchange. It is possible to ensure heat and mass balance without expelling large amounts of moist air into the ambient air.

9 Claims, 5 Drawing Sheets

FIG_1
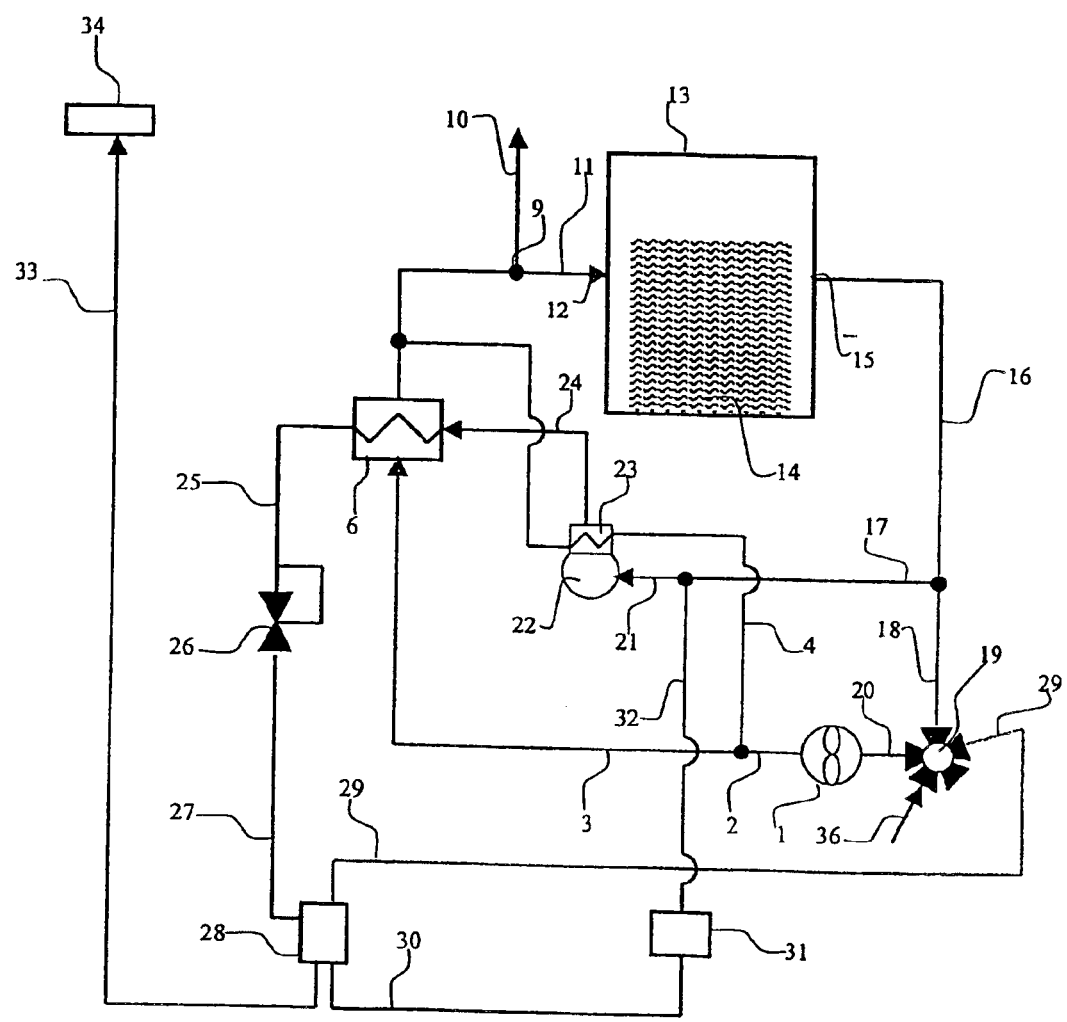

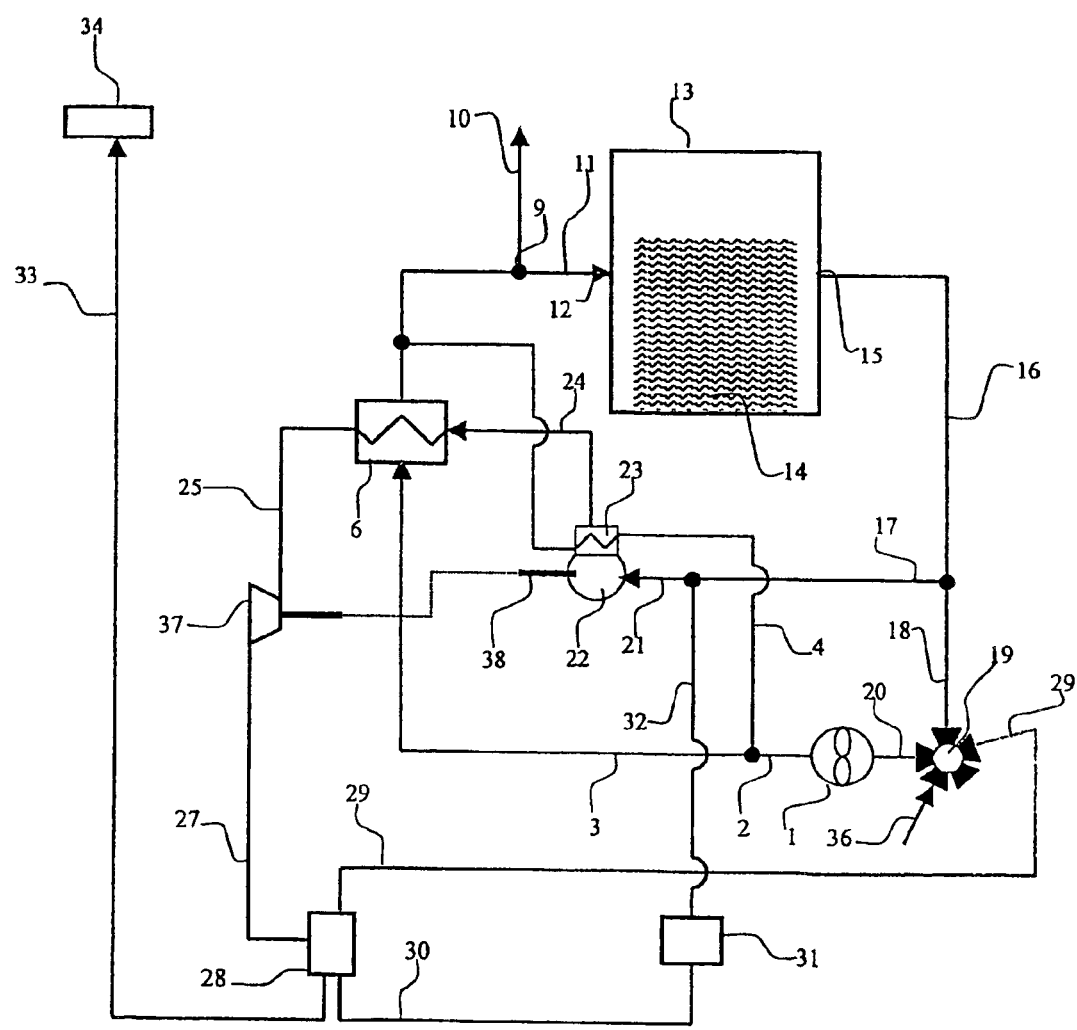
FIG_2

FIG_3
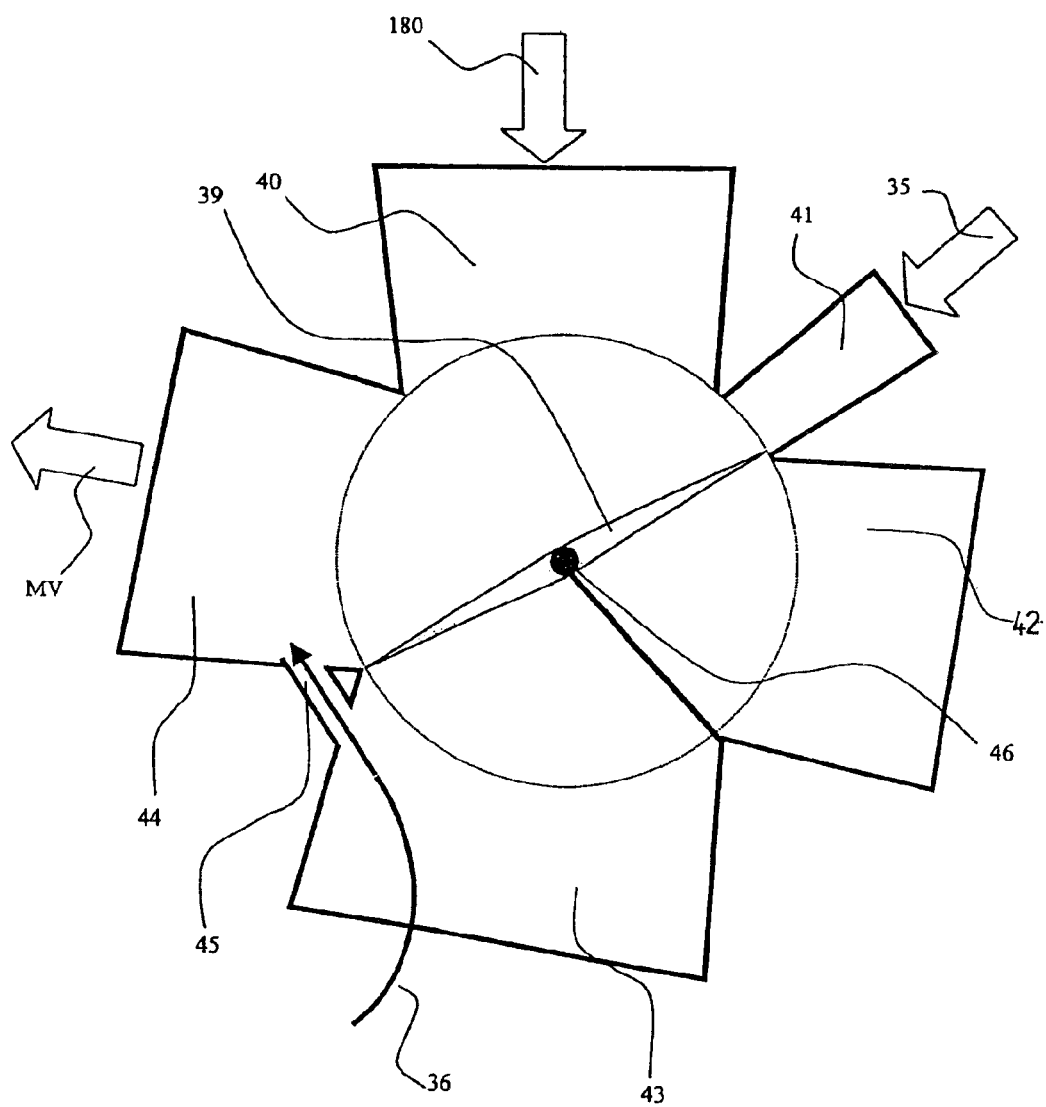

FIG_4
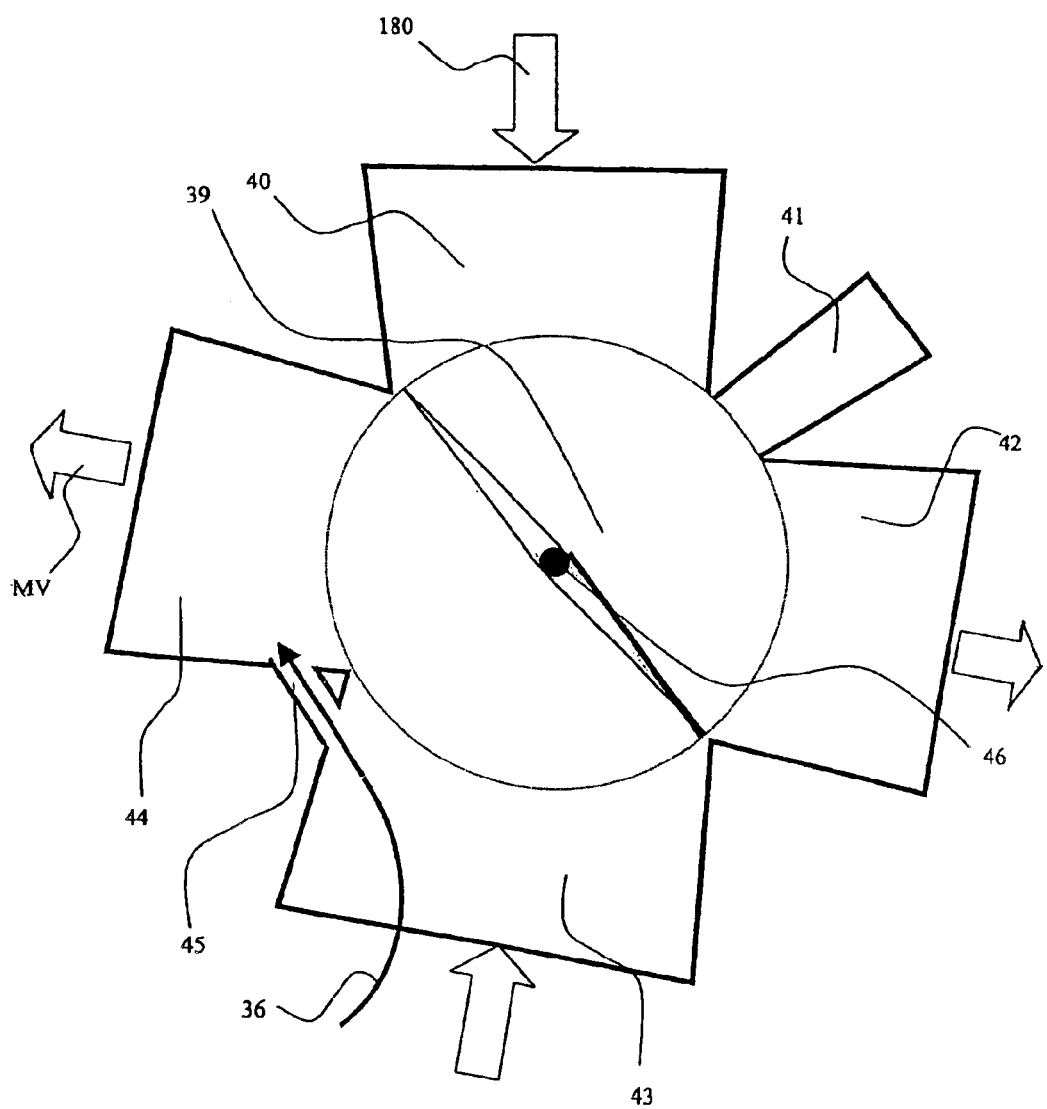

FIG_5
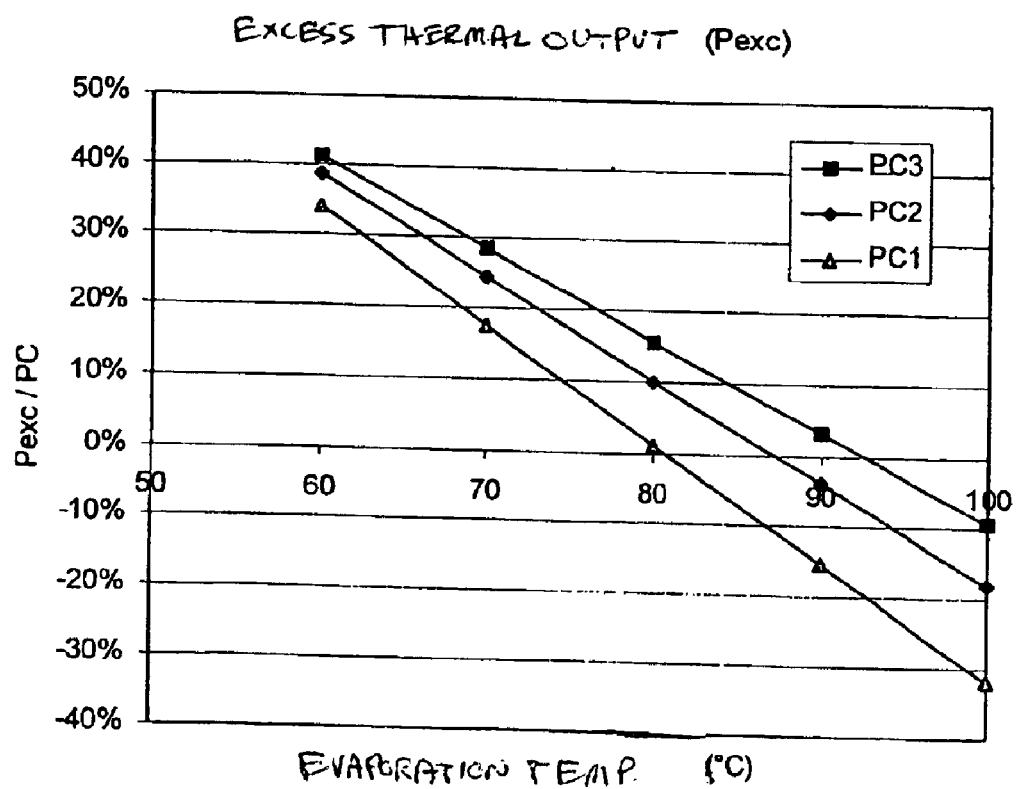

METHOD AND INSTALLATION FOR DRYING A MASS OF FIBROUS MATERIALS BY MECHANICAL COMPRESSION OF VERY MOIST AIR

FIELD CONCERNED

The present invention pertains to a method and an installation for drying a mass of fibrous material, and in particular wet laundry after washing.

STATEMENT OF THE PROBLEM POSED AND PRIOR ART

The Denis CLODIC patent application filed in France on behalf of ARMINES, on Nov. 2, 1998, under No. 98 13902 and published under No. FR 2 795 372, describes a superheated water vapor (SWV) drying method. The superheated water vapor exchanges its heat with the laundry, in which the water evaporates at 100° C. and then this water is condensed on a condenser to keep the pressure constant in the circuit and at the same time to make possible a new superheating of the vapor. This vapor is set in motion by means of a fan. In the method according to the prior art, a fraction of the superheated water vapor (SWV) is subjected to a compression process in order to recover the heat of condensation to superheat the water vapor at the inlet of the drying zone. This SWV drying method makes it possible to improve the overall energy efficiency by about 60% (decrease from a consumption of 700 Wh/kg of dry cotton, which is the typical consumption of the current better tumble dryers, to less than 330 Wh/kg of dry cotton). However, the embodiment of a water vapor circuit at atmospheric pressure and at a temperature higher than 100° C. may pose sealing problems, and in particular when passing revolving joints.

The object of the present invention is to make it easier to technically embody the equipment for drying laundry while maintaining the energy performances of this method at a level comparable to the method according to the prior art.

SUMMARY OF THE INVENTION

The present invention pertains to a method for drying a mass of wet fibrous material, and in particular a mass of laundry, located in a drying zone. The method comprises the step of ventilating very moist air, via a ventilation circuit, through the mass of fibrous material located in the drying zone, whose moisture content is less than that of the very moist air located inside the drying zone, at a pressure close to atmospheric pressure and at a temperature higher than that of the material to be dried. In this way, it is possible to extract from the fibrous material, by evaporation, in the form of water vapor, the moisture that it contains. The method additionally comprises the steps:
of recovering the heat of condensation of the water vapor extracted from the fibrous material to heat the moist air,
of providing leaks between the outside ambient air and the ventilation circuit upstream and downstream of the drying zone.

The leaks which are located on the part of the ventilation circuit upstream of the drying zone make possible a mass and heat exchange to the outside ambient air. The leaks located on the part of the ventilation circuit downstream of the drying zone make possible an exchange of mass with inlet of ambient air. In this way, it is possible to ensure heat and mass balances without expelling large amounts of moist air into the ambient air. It is also thus possible to introduce natural leaks at least in part, and in particular in the mobile parts, in the normal operating cycle of the drying method.

Preferably, the method according to the present invention is such that, to recover the heat of condensation of the water vapor extracted from the fibrous material:
a fraction of the moist air is taken at the outlet of the drying zone,
the fraction taken is compressed before introducing it into a condenser which is located on a pipeline at the inlet of the drying zone.

The condensation in the condenser of the fraction taken supplies the heat energy needed to heat the moist air at the inlet of the drying zone.

Preferably, the method according to the present invention is such that the fraction taken is compressed at a pressure such that the condensation temperature in the condenser is in the range of 95° C. to 135° C. The moist air at the inlet of the drying zone is thus heated in a temperature range of 120° C. to 130° C.

DRYING INSTALLATION

The present invention also pertains to an installation for drying a mass of wet fibrous material, and in particular a mass of laundry. The mass of fibrous material is located in a drying zone. The installation comprises a ventilation circuit supplying the drying zone with very moist air having a moisture content that is less than that located inside the drying zone, at a pressure close to atmospheric pressure and at a temperature higher than that of the material to be dried. In this way, it is possible to extract from the fibrous material, by evaporation, in the form of water vapor, the moisture that it contains. The installation additionally comprises a circuit for recovering the heat of condensation of the water vapor extracted from the fibrous material. The recovery circuit is intended to heat the moist air. The installation additionally comprises appropriate leaks between the outside ambient air and the ventilation circuit, which are located upstream and downstream of the drying zone. The leaks located on the part of the ventilation circuit upstream of the drying zone make possible a mass and heat exchange to the outside ambient air. The leaks located on the part of the ventilation circuit downstream of the drying zone make possible an exchange of mass with inlet of ambient air. It is thus possible to ensure heat and mass balances without expelling large amounts of moist air into the ambient air. It is also thus possible to introduce natural leaks at least in part, and in particular in the mobile parts, in the operating cycle of the drying installation.

Preferably, according to the present invention, the installation is such that the ventilation circuit comprises:
a fan located downstream of the drying zone,
a condenser comprising a cooling circuit.

The cooling circuit is located downstream of the fan and upstream of the drying zone.

Preferably, the installation according to the present invention is such that the recovery circuit, which is intended to recover the heat of condensation of the water vapor extracted from the fibrous material, comprises:
a pipeline making it possible to divert, at the outlet of the drying zone, a fraction of the moist air to a compressor located upstream of the condenser,
a diverting pressure reducer or a volumetric turbine, located downstream of the compressor making it possible to maintain a constant condensation pressure,
a phase separator located downstream of the diverting pressure reducer or the volumetric turbine making it possible to separate the condensed liquid water from the air.

The condensation in the condenser of the diverted fraction of moist air supplies the heat energy needed to heat the moist air before entering the drying zone.

Preferably, the installation according to the present invention is such that the compressor compresses the diverted fraction of moist air at a pressure such that the condensation temperature in the condenser is in the range of 95° C. to 135° C. The result is that the moist air at the inlet of the drying zone is heated in a temperature range of 95° C. to 135° C.

Preferably, the installation according to the present invention is such that the cooling circuit of the condenser is preferably cross current with countercurrent tendency.

Preferably, the installation according to the present invention is such that it comprises a five-way valve comprising one way for venting.

The drying method according to the present invention, by mechanical compression of very moist air, makes it possible to reduce the consumption of electric energy of domestic dryers. Their consumption is on the order of 700 Wh/kg of laundry, the method according to the present invention makes it possible to reduce this to about 350 Wh/kg of dry laundry.

The implementation of the method is simple and the reasons why shall be understood below. The method makes it possible to use the technologies available to produce domestic, commercial or industrial tumble dryers. The drying method according to the present invention may be applied to materials other than wet laundry after washing. It may be applied to materials, such as powders, wood, cement, etc.

The importance of the method in terms of energy and the easiness of producing the drying equipment are due to the fact that the method uses a mechanical compression of very moist air. In the sense of the present invention, very moist air is defined as air containing between 85% and 95% moisture for temperatures ranging from 80° C. to 90° C., i.e., absolute moistures of 400 g to 1200 g of water per kg of dry air. It is recalled that ambient air at 25° C. has an absolute moisture of 8 g to 20 g of water per kg of dry air.

The use of very moist air has a number of advantages as the following description will show, and in particular very moist air makes it possible to use systems, whose sealing is easy to create and design, thus both closed systems for intermittent batch drying and stream and therefore continuous drying systems.

The drying is performed at atmospheric pressure, the water evaporates thanks to the partial pressure difference of the water vapor contained in the mass of fibrous material and that of the water vapor contained in the hot air. The pressure of the water vapor contained in the hot air is less than that of the water vapor contained in the mass of fibrous material.

BRIEF DESCRIPTION OF DRAWINGS

Other features and advantages of the present invention shall become evident after reading the description of embodiment variants of the present invention given by way of indicative and non-limiting example. The block diagram of the installation is presented with its embodiment variants:

FIG. 1 shows an embodiment variant of a batch drying installation,

FIG. 2 shows a second embodiment variant of a batch drying installation,

FIG. 3 shows the position of the five-way valve during the heating phase and the drying phase, FIG. 4 shows the position of the five-way valve during the cooling phase, and FIG. 5 is a graphic representation of three levels of condensation output.

DETAILED DESCRIPTION

FIG. 1, which shows an embodiment variant of a batch-type dryer (for example, a tumble dryer), shall now be described. All of the flow rates indicated are, unless specified otherwise, mass flow rates, whose IS (international system) unit is kg/sec. The wet material 14 to be dried is located in the drying chamber 13. The hot air flow at the inlet 12 of the drying chamber is designated by the abbreviation MVEe (chamber Ventilated Inlet Flow). The hot air enters the drying chamber 13 by the inlet pipeline 11. The typical temperature of the entering hot air is in the range of 120° C. to 130° C. The absolute moisture of the entering hot air ranges from 360 g to 1100 g per kg of dry air, i.e., 8% to 10% less than the absolute moisture of the moist air at the outlet 15 of the drying chamber 13. The wet material 14, whose moisture must be extracted, is at a temperature that ranges from 60 to 90° C. At the outlet 15 of the drying chamber 13, the flow of the exiting moist air is designated by the abbreviation MVSe (chamber Outlet Ventilated Flow). The moist air exits from the drying chamber 13 by the outlet pipeline 16. The temperature of the moist air at the outlet 15 of the drying chamber 13 varies from 80 to 95° C. The moist air at the outlet 15 of the drying chamber 13 has an absolute moisture that ranges from 400 g to 1200 g per kg of dry air. The flow of the exiting moist air MVSe is the sum of the entering hot air flow MVEe and of the evaporated water flow Me coming from the wet material to be dried 14.

FIG. 1 shows, fictitiously, the outlet point 9 of natural or developed leaks to the outside 10 on the inlet pipeline 11 of the drying chamber 13. The natural or developed leaks to the outside are located upstream of the drying chamber 13, after the air circulation fan 1. In fact, in this part of the circuit, the air circulation fan 1 creates a slight overpressure in relation to the atmospheric pressure. The air exiting at the outlet point 9 is under the pressure, temperature and moisture conditions of the circuit at the inlet 12 of the drying chamber 13. The moist air flow of the natural or developed leaks to the outside, upstream of the drying chamber 13, is designated by the abbreviation MF. The natural leaks appear mainly at the seals of the flange or flanges of the drum of a tumble dryer.

The moist air flow MF of the natural or developed leaks to the outside is compensated by the natural or developed infiltrations of air. The entering air flow 36 due to the natural or developed infiltrations by the five-way valve 19 is designated by the abbreviation MI. The entering air flow MI is such that MI=MF. The MI flow is under the pressure, temperature and moisture conditions of the space in which the drying chamber is located.

The moist air flow MVEs flowing in the outlet pipeline 16 of the chamber 13 is split into two flows into the pipelines 17 and 18, respectively.

A first flow, designated below by the abbreviation MV1, flows to the fan 1 in the pipeline 18. A second flow, designated below by the abbreviation MC, flows to the compressor 22 via the pipelines 17 and 21. The ratio between the MV1 and MC flows is fixed by the fan 1 for MV1 and by the compressor 22 for MC, respectively. The ratio of the flows, designated below by RD (RD=MC/MV1) varies from 5% to 10%.

The backflow pipeline of the fan 2 is split into a main pipeline 3 and a diverted pipeline 4. A third flow, designated below by the abbreviation MVp (main ventilation flow) flows in the main pipeline 3. A fourth flow, designated below by the abbreviation MVd (diverted ventilation flow) flows in the diverted pipeline 4. The MVd flow in the diverted pipeline 4 represents 10% to 15% of the ventilated flow MV1.

The second moist air flow MC flowing in the pipeline 21 is compressed by a compressor 22 up to a pressure typically ranging from 4 to 7 bar absolute. At the outlet of the compressor 22, the backflow temperature of the moist air is on the order of 250° C. if no cooling device is put in place. It is necessary to cool the valve plate or the backflow volume 23. The valve plate or the backflow volume is cooled by designing a valve plate or a backflow volume with a surface comprising blades (not shown).

The cooling blades of the valve plate or the backflow volume 23 are arranged in the diverted pipeline 4 through which the diverted ventilation flow MVd flows. This results in a reheating of the MVd flow.

The cooling blades of the valve plate or backflow volume 23 make it possible to maintain the steady-state temperature of the valve plate or backflow volume at a temperature less than 160° C.

The description of the embodiment variant shown in FIG. 1 shall now be continued.

The condensation circuit of the condenser 6 receives the backflow pipeline 24 of the compressor 22, which is located downstream of same. The external cooling circuit of the condenser 6 receives the pipeline 3 in which the main ventilated flow MVp is reheated. The condenser 6 is a partial condenser: A large part (on the order of 90% of mass) of the water vapor of the very moist air flow MC exiting from the compressor 22 is condensed in it. The MC flow is diphasic at the outlet of the condenser 6. It is composed of a not very moist air flow called MAC 35 and a liquid water flow called MEC (MC=MEC+MAC). This diphasic flow MC is reduced to a pressure slightly greater than atmospheric pressure by the diverting pressure reducer 26. A diverting pressure reducer is a pressure reducer which keeps the pressure upstream constant and which delivers a variable flow to maintain it.

In the embodiment variant shown in FIG. 2, the diverting pressure reducer 26 is replaced with a volumetric expansion turbine 37. It also makes it possible to maintain a pressure upstream constant by modulating the flow crossing it. The diphasic flow MC is admitted via the pipeline 25 into the volumetric expansion turbine 37 where it is expanded up to a pressure slightly greater than atmospheric pressure. The shaft of the expansion turbine 37 may be coupled to the shaft of the drive motor of the compressor 38.

In the case of the variant of the diverting pressure reducer 26 (FIG. 1) or in the case of the variant of the expansion turbine 37 (FIG. 2), the expanded diphasic flow MC (MC=MAC+MEC) is admitted into the separator 28 via the pipeline 27. The liquid water flow MEC is separated from the air flow MAC in the separator 28. The liquid water flow MEC is reintegrated by the pressure difference in the reservoir 34 via the pipeline 33. The air flow MAC 35, itself expanded as well, is suctioned by the fan 1 via the outlet pipeline 29 of the separator 28 and the five-way valve 19. The flow MAC 35 coming from the pipeline 29 is thus mixed with the moist air flow MV1 180 coming from the pipeline 18. The air infiltration flow MI 36 is mixed with the flows MAC 35 and MV1 180. The flow called MV, suctioned by the fan 1 via the pipeline 20 and the five-way valve 19, is such that MV=MAC+MI+MV1.

As indicated above, the MV flow is split into the main flow MVp in the pipeline 3 and the diverted flow MVd in the pipeline 4.

The flow MVp enters the condenser 6 via the intermediate pipeline 3 and is reheated there from the typical outlet temperature of the drying chamber 13 on the order of 80° C. to 95° C. to the typical inlet temperature of the drying chamber 13 ranging from 120° C. to 130° C. Considering the fact that the vapor of the MC flow inside the tubes of the condenser 6 is condensed at a temperature typically ranging from 135° C. to 95° C., it is advantageous to design the condenser 6 in the form of a tubular exchanger comprising blades. The tubes are arranged in successive rows. A typical number of rows of tubes, in which MC is partially condensed inside the tubes, is 4 to 8. The arrangement of the tubes makes possible a global flow of the flows MC and MVp that is both cross current and with a countercurrent tendency, and the MVp flow runs into hotter and hotter zones corresponding to the progressive cooling of the MC flow. This cross current flow with countercurrent tendency minimizes the differences in temperature between the MVp flow which is reheated and the MC flow which is partially condensed.

The output PC exchanged in the condenser 6 comprises both the desuperheating output of the moist air flow MC and the condensation output of the MEC water contained in this MC flow.

The condensation pressure of the water vapor is selected as a function of the flow ratio RD and the output PC to be exchanged to the condenser 6. The energy balance equation of the drying device is thus written as:

$$PC=Pe+Pth+PF \quad \text{Equation (1)}$$

The heat output Pe is the product of the evaporated vapor flow Me of the wet material to be dried 14 and the latent heat of vaporization of the water Lv at the corresponding partial pressure. Pe=Lv·Me.

The heat losses Pth come from the heat losses of the chamber 13 and the different pipelines of the circuit. These are losses due to convection, radiation and conduction of the dryer in relation to the space in which it is located.

PF is the heat output lost by the leak flow MF at an enthalpy Hf minus the air infiltration flow MI at an enthalpy Hi. The heat output lost by the PF leak is such that:

$$PF=(MF \cdot Hf)-(MI \cdot Hi)$$

Hf and Hi are calculated by knowing the temperatures, pressures and absolute moistures of the flows MF and MI.

By considering that the evaporated water flow Me is equivalent to the condensed flow MEC, the condensation output PC can thus be expressed as:

$$PC=Pe+W_{comp} \quad \text{Equation (2)}$$

In which $W_{comp}$ is the compression output transmitted to the compressed flow MC.

Equation (2) is the application of energy conservation to the compressed flow MC circuit.

By bringing together the Equations 1 and 2, it is observed that the compression output $W_{comp}$ transmitted to the MC flow is compensated in a steady-state manner by the heat losses Pth and by the losses due to leaks PF, and this observation makes it possible, by fixing the condensation output PC and the energy efficiency of the compression cycle, to define the direct heat losses and those due to leaks, making possible the heat balance of the system. The heat balance of the system is reached when the compression output $W_{comp}$ is equal to the sum of the heat losses Pth and the losses due to leaks PF. The excess output is thus zero. The excess output designated by the abbreviation Pexc is such that:

$$Pexc=W_{comp}-Pth-PF$$

FIG. 5 shows, for three levels of condensation output PC, PC1, which is a unit reference condensation output, PC2=1.5

PC1 and PC3=2 PC1. The vertical axis represents the excess output Pexc as a percentage of PC, the horizontal axis represents the evaporation temperature of the wet material. FIG. 5 thus shows the variation of the excess output Pexc as a function of the drying temperature and for the three levels of condensation output PC1, PC2 and PC3, respectively.

The 0% level indicates that the heat produced by the compression work $W_{comp}$ is completely compensated by the losses due to heat losses Pth and the losses due to leaks PF. The heat excess Pexc defined above is thus zero. When Pexc is negative, the losses due to heat losses Pth and those due to leaks PF are too high and the balance of the system at the corresponding drying temperature is not possible. Likewise, when Pexc is positive, the losses due to heat losses Pth and those due to leaks PF are too low to compensate the heat produced by the compression work $W_{comp}$, the balance of the system at the corresponding drying temperature is not possible.

For a constant leak flow MF and a constant infiltration flow MI, the heat rejection PF is all the greater since the drying temperature of the wet material 14 is high and the specific moisture of the moist air in the drying chamber 13 is high.

For a constant leak flow MF and a constant infiltration flow MI, the heat rejection PF tends toward a maximum value when the drying temperature of the wet material 14 is 100° C. and when the moist air in the drying chamber 13 is completely replaced with water vapor.

The drying method according to the present invention, in very moist air, integrates the leak flow stresses in the design itself of the method and of the device using the method.

For a domestic tumble dryer, the typical leak rate MF is in the range of 1% to 2%, i.e., 1% to 2% of the flow output MV1 is rejected outside of the circuit. The method of drying by mechanical compression of very moist air according to the present invention is compatible with the defined typical leak rate MF and constitutes therein a particular technical relevance.

The present invention makes it possible to embody a drying system with a single exchanger on the air flow MVp, which particularly distinguishes the present invention from the systems using a heat pump that requires two exchangers: an evaporator and a condenser.

In the case of a batchwise drying system the drying operation takes place in three phases. In the case of a stream drying system these three phases succeed one another in space.

To describe the succession of the three phases, the operation of the five-way valve 19 is detailed below with reference to FIGS. 3, 4 and 5.

The five-way valve 19 has five ways, on which different pipelines shall be connected. A mobile flap 39 has an axis of rotation 46 around which it can turn, controlled by an actuator (not shown) that is integral with the axis of rotation 46.

The way 40 is connected via the pipelines 18 and 16 downstream of the drying chamber 13. The way 41 is connected via the pipeline 29 downstream of the separator 28. The way 42 is a venting way for purging the circuit. The way 43 is a way for admitting fresh air. The way 44 is connected to the pipeline 20 upstream of the fan 1. Between the way 43 and the way 44 there is a bypass opening 45, which permits the leak flow MI 36 to enter the pipeline 20 via the way 44. The depression created in the pipeline 20 due to the suction of the fan 1 makes it possible to introduce the entering air flow 36 MI.

During the heating phase I, a quantity of water present in the separator 28 is transferred via the pipeline 30 into the switched-on electric boiler 31. The flow of evaporated water vapor into the boiler 31, represented by the abbreviation Meb, is suctioned by the compressor 22, via the pipeline 32. The Meb flow is mixed upstream of the compressor 22 with the MC1 flow coming from the drying chamber 13, via the pipelines 16 and 17. The sum of the Meb and MC1 flows forms the MC flow suctioned and compressed by the compressor 22. The MC flow is a mixture of very moist air. It is condensed in the condenser 6, thus permitting the reheating of the MVp flow coming from the drying chamber 13, via the pipeline 16, the five-way valve 19, the fan 1 and the inlet pipeline 3 of the condenser 6. During the heating phase I, the flap 39 (FIG. 3) connects with the pipeline 20 (way 44), the pipeline 18 (way 40), the pipeline 29 (way 41) and, via the by-pass 45, the way 43, by which the leak flow MI 36 enters. This results in that the fan 1 suctions the MV1 flow coming from the chamber 13, the MAC flow 35 coming from the separator 28 and the MI flow 36 coming from the unit, and reverses the MV flow to the condenser 6.

The temperature difference measured between the inlet 12 of the drying chamber 13 and the outlet 15 of the drying chamber 13 is used for the regulation of the system, making it possible to pass from the heating phase I to the drying phase II. When the temperature difference is typically greater than 30K and when the desired temperature level at the inlet 12 of the chamber 13 is reached, the electric supply of the electric resistance of the boiler 31 is stopped, and the drying phase II can then begin. During the drying phase II, the flap 39 occupies the same position as that which it occupied during the heating phase and connects with the same ways and the same pipelines. The drying of the fibrous mass 14 in the drying chamber 13 is carried out at a constant rate of evaporation until a drying threshold is reached. When this drying threshold is reached, the evaporated flow decreases because the capillary supply in the material is no longer ensured. This threshold is identified and detected by a decrease in the temperature difference between the inlet 12 of the drying chamber 13 and the outlet 15 of the drying chamber 13. The outlet temperature of the drying chamber 13 increases. The appropriate difference for each material to be dried and, in correlation, the moment when the drying can be stopped are determined experimentally.

The cooling phase III is a phase during which the fibrous material is brought back to a temperature close to ambient temperature. For this purpose, the compressor 22 is stopped, the fan 1 is still operating. During the cooling phase III, the flap 39 (FIG. 4) connects with:
on the one hand, the way 43 by which the outside air enters and the pipeline 20 (way 44),
on the other hand, the pipeline 18 (way 40), the pipeline 29 (way 41) and the venting way 42.
This results in that:
the fan 1 suctions a flow of outside air via the ways 43 and 44, and reverses it back to the chamber 13, thus cooling the fibrous material 14,
the MV1 air coming from the chamber 13 is reversed to the outside via the way 42.

When the temperature of the flow at the outlet 15 of the chamber 13 is on the order of 40° C., the fan 1 is stopped and the drying cycle is completed.

| Tumble Dryer III Nomenclature | |
| --- | --- |
| 1 | air circulation fan |
| 2 | backflow pipeline of the fan |

-continued

Tumble Dryer III Nomenclature

| | |
|---|---|
| 3 | main pipeline |
| 4 | diverted pipeline |
| 6 | condenser |
| 9 | outlet point |
| 10 | natural or developed leaks to the outside |
| 11 | inlet pipeline |
| 12 | inlet of the drying chamber |
| 13 | drying chamber |
| 14 | wet material |
| 15 | outlet of the drying chamber |
| 16 | outlet pipeline |
| 17 | pipeline |
| 18 | pipeline |
| 19 | five-way valve |
| 20 | pipeline |
| 21 | pipeline |
| 22 | compressor |
| 23 | valve plate or backflow volume |
| 24 | backflow pipeline of the compressor |
| 25 | pipeline |
| 26 | diverting pressure reducer |
| 27 | pipeline |
| 28 | separator |
| 29 | outlet pipeline of the separator |
| 30 | pipeline |
| 31 | electric boiler |
| 32 | pipeline |
| 33 | pipeline |
| 34 | reservoir |
| 35 | not very moist air flow called MAC |
| 36 | air infiltration flow MI |
| 37 | volumetric expansion turbine |
| 38 | shaft of the drive motor of the compressor |
| 39 | mobile flap |
| 40 | way |
| 41 | way |
| 42 | venting way |
| 43 | way for admitting fresh air |
| 44 | way |
| 45 | bypass opening |
| 46 | axis of rotation |
| 180 | moist air flow MV1 |

What is claimed is:

1. A method for drying a mass of wet fibrous material, and in particular a mass of laundry, located in a drying zone;

the method comprising the step:

of ventilating, via a ventilation circuit, through the mass of fibrous material located in the drying zone, very moist air, whose moisture content is less than that inside the drying zone, at a pressure close to atmospheric pressure and at a temperature higher than that of the material to be dried;

whereby it is then possible to extract from the fibrous material, by evaporation, in the form of water vapor, the moisture that it contains;

the method additionally comprising the steps:

of recovering the heat of condensation of the water vapor extracted from the fibrous material to heat the moist air;

of providing leaks between the outside ambient air and said ventilation circuit upstream and downstream of the drying zone; wherein, the leaks are located on the part of the ventilation circuit upstream of the drying zone for exchanging a mass and heat to the outside ambient air; and the leaks are located on the part of the ventilation circuit downstream of the drying zone for exchanging a mass and heat by inlet of ambient air;

whereby a balance of heat and mass is achieved without expelling large amounts of moist air into the ambient air; and whereby it is then possible to introduce natural leaks at least in part, and in particular in parts of the system that are mobile, in the normal operating cycle of the drying method.

2. A method in accordance with claim 1; the method being such that to recover the heat of condensation of the water vapor extracted from the fibrous material:

a fraction of the moist air is taken at the outlet of the drying zone, the fraction taken is compressed before introducing it into a condenser located on a pipeline at the inlet of the drying zone;

whereby condensation in the condenser of the fraction taken supplies the heat energy needed to heat the moist air at the inlet of the drying zone.

3. A method in accordance with claim 2; the method being such that:

the fraction taken is compressed at a pressure such that the condensation temperature in the condenser is in the range of 95° C. to 135° C.;

wherein the moist air at the inlet of the drying zone is heated in a temperature range of 120° C. to 130° C.

4. A system for drying a mass of wet fibrous material, and in particular a mass of laundry, the mass of fibrous material being located in a drying zone;

the system comprising:

a ventilation circuit supplying the drying zone with very moist air having a moisture content less than that located inside the drying zone, at a pressure close to atmospheric pressure and at a temperature higher than that of the material to be dried;

whereby moisture is extracted from the fibrous material, by evaporation, in the form of water vapor;

the system additionally comprising:

a circuit for recovering the heat of condensation of the water vapor extracted from the fibrous material; the recovery circuit being configured to heat the moist air;

the system additionally comprising:

appropriate leaks between outside ambient air and the ventilation circuit, located upstream and downstream of the drying zone;

wherein, the leaks are located on the part of the ventilation circuit upstream of the drying zone for exchanging a mass and heat to the outside ambient air;

and the leaks are located on the part of the ventilation circuit downstream of the drying zone for exchanging a mass by inlet of ambient air;

wherein natural leaks are introduced at least in part, in parts of the system that are mobile, in a normal operating cycle of the drying system.

5. A drying system in accordance with claim 4; the system being such that the ventilation circuit comprises:

a fan located downstream of the drying zone, a condenser comprising a cooling circuit;

the cooling circuit being located downstream of the fan and upstream of the drying zone.

6. A drying system in accordance with claim 5; the system being such that the recovery circuit, which recovers the heat of condensation of the water vapor extracted from the fibrous material, comprises:

a pipeline for diverting, at an outlet of the drying zone, a fraction of the moist air to a compressor located upstream of the condenser, a diverting pressure reducer or a volumetric turbine located downstream of the compressor for maintaining a substantially constant condensation pressure, a phase separator located downstream of the diverting pressure reducer or of the volumetric turbine for separating the condensed liquid water from the air;

wherein the condensation in the condenser of the fraction of diverted moist air supplies the heat energy needed to heat the moist air before the moist air enters the drying zone.

7. A drying system in accordance with claim 6; the system being such that the compressor compresses the diverted fraction of moist air at a pressure such that the condensation temperature in the condenser is in the range of 95° C. to 135° C.;

whereby the moist air at the inlet of the drying zone is heated in a temperature range of 95° C. to 135° C.

8. A drying system in accordance with any of the claims 5 through 7; wherein the cooling circuit of the condenser has a cross current flow with a countercurrent tendency.

9. A drying system in accordance with any of the claims 4 through 7; the system comprising a five-way valve comprising a venting way.

* * * * *